US 8,010,985 B2

(12) United States Patent
McKinley et al.

(10) Patent No.: US 8,010,985 B2
(45) Date of Patent: Aug. 30, 2011

(54) METHOD AND SYSTEM FOR RESOURCE MANAGEMENT IN A VIDEO ON-DEMAND SERVER

(75) Inventors: Brittain S. McKinley, Groton, MA (US); Mark J. Rutan, Northborough, MA (US)

(73) Assignee: General Instrument Corporation, Horsham, PA (US)

(*) Notice: Subject to any disclaimer, the term of this patent is extended or adjusted under 35 U.S.C. 154(b) by 750 days.

(21) Appl. No.: 11/143,428

(22) Filed: Jun. 1, 2005

(65) Prior Publication Data

US 2005/0267948 A1 Dec. 1, 2005

Related U.S. Application Data

(60) Provisional application No. 60/576,095, filed on Jun. 1, 2004, provisional application No. 60/576,269, filed on Jun. 1, 2004, provisional application No. 60/576,338, filed on Jun. 1, 2004, provisional application No. 60/576,402, filed on Jun. 1, 2004.

(51) Int. Cl.
*H04N 7/173* (2006.01)

(52) U.S. Cl. ............... 725/87; 725/86; 725/90; 725/91; 725/96

(58) Field of Classification Search .............. 725/87, 725/94, 86, 90, 91, 92, 96
See application file for complete search history.

(56) References Cited

U.S. PATENT DOCUMENTS

| | | | | |
|---|---|---|---|---|
| 6,536,043 | B1* | 3/2003 | Guedalia .................. | 725/90 |
| 2003/0005454 | A1* | 1/2003 | Rodriguez et al. ............. | 725/89 |
| 2003/0093488 | A1* | 5/2003 | Yoshida et al. ............... | 709/213 |
| 2004/0003101 | A1 | 1/2004 | Roth et al. | |
| 2005/0267948 | A1 | 12/2005 | McKinley et al. .............. | 725/87 |
| 2005/0278760 | A1 | 12/2005 | Dewar et al. .................... | 725/91 |
| 2006/0053253 | A1 | 3/2006 | Roth et al. ..................... | 709/231 |
| 2006/0064500 | A1 | 3/2006 | Roth et al. ..................... | 709/231 |

FOREIGN PATENT DOCUMENTS

EP      1313285      5/2003

OTHER PUBLICATIONS

Tavanapong W et al: "Video caching network for on-demand video streaming" Globecom'02. 2002—IEEE Global Telecommunications Conference. Conference Proceedings. Taipei, Taiwan, Nov. 17-21, 2002, IEEE Global Telecommunications Conference, New York, NY : IEEE, US, vol. vol. 1 of 3, Nov. 17, 2002, pp. 1723-1727, XP010636438 ISBN: 0-7803-7632-3.
Examination Report, European Patent Application No. 05757201.8 (Nov. 22, 2007).
Supplementary European Search Report, European Patent Application No. 05757201.8 (Aug. 20, 2007).
International Preliminary Report on Patentability, PCT/US2005/019293 (Dec. 4, 2006).
International Search Report, PCT/US2005/019293 (Aug. 25, 2006).

* cited by examiner

*Primary Examiner* — Joseph P Hirl
*Assistant Examiner* — Jivka Rabovianski
(74) *Attorney, Agent, or Firm* — Stewart M. Wiener

(57) ABSTRACT

An on-demand server configured to dynamically control and optimize memory utilization while minimizing access to disk storage by monitoring content addressable memory (CAM) usage so as to remove the content from resident CAM memory and page the same adaptively and to eliminate creating separate files for trick playback of content streamed to a customer. The method and system dynamically uses the current concurrency count of the contents to optimize memory utilization so as to swap content in and out of memory as the concurrency values change in conjunction with an on-demand memory based server to provided advantages of optimizing the usage of server resources.

11 Claims, 4 Drawing Sheets

METHOD AND SYSTEM FOR RESOURCE MANAGEMENT IN A VIDEO ON-DEMAND SERVER

This application claims the benefit of U.S. Provisional Application No. 60/576,095, filed Jun. 1, 2004, U.S. Provisional Application No. 60/576,269, filed Jun. 1, 2004, U.S. Provisional Application No. 60/576,338, filed Jun. 1, 2004, and U.S. Provisional Application No. 60/576,402, filed Jun. 1, 2004.

BACKGROUND OF THE INVENTION

1. Field of the Invention

The present invention relates to methods and apparatus for managing resources in an on-demand, memory-based server and, in particular, managing resources to control and service a large number of simultaneous streams of audio, video and or other data formats being played out to a network.

2. Background Description

Conventional on-demand systems utilize disk storage based systems that stream content to a receiving device over a network. On-demand servers obtain, store and play content such as, for example but not limited to, audio files, encoded television programming, and encoded movies to the customer. On-demand servers request content from long term storage devices such as disk arrays, disk storage farms, tape drives or other storage media, whereby content is stored across the this term storage, e.g. stored in pieces, strips or using other schemes across the disk array or RAID system. Upon request, the on-demand server loads content from the stored location such as Long Term Storage (LTS) or Near Term Storage (NTS) into a stream buffer or cache, for example, using a first-in-first-out (FIFO) buffer mechanism of the on-demand server that is assigned to the stream. The server streams content out of the FIFO buffer to the receiving device.

Conventional on-demand servers have a disadvantage in their reliance on disk access to support the streaming. Such systems and servers do not recognize or otherwise account for concurrent usage of the same streaming content. On-demand servers are configured and rated to operate on a one-to-one (1:1) ratio, whereby the rating is based on output streams showing the capacity of receiving and streaming an on-demand request by a customer. The design of present on-demand servers also have the disadvantage of increased implementation cost per stream due, in part, to increased hardware elements required, built in redundancies of the implementation, and the inability to detect and support concurrent streaming of content.

Conventional on-demand servers also have disadvantages relating to limited internal memory that can be used for streaming. This inhibits or prevents the capability to support concurrency. Concurrency is the ability to stream the same copy of content to multiple receiving devices. This is a very common usage scenario for on-demand systems. For example, this occurs when receiving devices request the same pay-per view event either simultaneously or within short time of each other. Numerous concurrent requests can reduce bandwidth and create bottlenecks in conventional on-demand servers. The on-demand server will request data from disk storage multiple times for the same content as to satisfy the receiving devices requests.

On-demand servers heretofore have sought to solve concurrency problems by creating redundant content stored on near term storage (NTS), in long term disk storage or by using optimization techniques that require manual insertion of a resident flag to mark a limited subset of specific content that should be pulled into memory. While this model is effective, it requires considerable management of the content library and does not provide a dynamic mechanism that changes based on the real time usage model. All of such optimization schemes are not as efficient and cost effective as desired.

Moreover, with the introduction of trick play support, conventional on-demand server resources are strained further by requests for trick playback functions such as fast forward, rewind, fast rewind, pause, stop and record. The problems described above are exacerbated because disk-storage-based on-demand servers offering trick play store a separate secondary data file—trick play file—to disk storage and such servers must switch to the secondary file when trick modes requested by the receiving device. Storing secondary files has disadvantages in that additional resources of the server, including but not limited to storage and processing resources, are needed to support the storage and retrieval of multiple files for a single piece of content. Simply, more disk storage, bandwidth and clock cycles are required to seek, find and stream trick files~for example, to play the content in a fast-forward mode~when a receiving device requests a particular function of programming being streamed to the TV and then to return to playing a separate files that represents the content streaming at normal speed. Disadvantages remain in the hardware configuration of conventional disk storage based video on-demand servers. Such hardware configurations rely on meeting a 1:1 ratio by stripping MPEG pages and controlling the process with VOD servers reassembling files for streaming to the receiving device. Trick mode files are stored as a separate data file. Clustering and redundant architectures increase overall server cost, increase the cost per stream and cost per trick mode to the end user as additional hardware is needed to support efficient playback of a large number of streams. Attempts to increasing the bandwidth has not always solved the concurrency problem in part due to inherent physical limitations of disk storage devices such as, for example, the seek time of a particular request and return of a strip of content to stream out to the network. Moreover, bottlenecks still occur when concurrency requests become to numerous so as to strain server resources, or cause them to fail, resulting in content not being provided on-demand to a receiving device As a result, a solution is needed to these problems so as to improve the concurrent streaming of content from on-demand servers.

Accordingly there is a need for an on-demand server that can dynamically control and optimize memory utilization while minimizing access to disk storage. There also is a need for a method and system that removes the resident marking requirement of conventional on-demand systems. Additionally, there is a need for a method and system that eliminates creating separate files for trick playback of content streamed to a customer. Finally, there is a need for a method and system that dynamically uses the current concurrency count of the contents to optimize memory utilization so as to swap content in and out of memory as the concurrency values change. The present invention therefore in conjunction with an memory-based on-demand server provides advantages of optimizing the usage of server resources.

SUMMARY OF THE INVENTION

One aspect of the present invention manages resident content and segmented content in the content addressable memory-based of an on-demand server.

The present invention determines an efficient combination of resident and segmented content based on usage count of the active contents.

The present invention determines an efficient combination of resident and segmented contents based on available bandwidth information allocated to streaming.

The invention dynamically manages the trick mode rates of video streams playing segmented content.

This invention is a method of dynamically managing the memory cache on a DRAM based VOD server. The invention uses DRAM memory resources and the current usage state to determine which program contents (MPEG-2, HD or other audiovisual data file standards) can be made resident and which program contents will be paged between DRAM memory and disk storage. The method utilizes the adaptive concurrency count of program contents requested for streaming by customers (output streams) to determine memory and bandwidth allocation between resident and paged content. The method is adaptive to streaming requests and adjusts which program contents are resident and paged, thereby swapping program content in and out of memory based on changing concurrency values. The method further minimizes disk access by placing highly utilized contents into memory first.

The method also is further advantageous to make it possible to support efficient playback of a larger number of programs than would otherwise be possible on a given hardware configuration at a lower cost per stream. It takes into account bandwidth limitations and settings to prevent trick mode stalls due to unavailable bandwidth.

DESCRIPTION OF THE DRAWINGS

These and other advantages of the present invention are best understood with reference to the drawings, in which.

DETAILED DESCRIPTION OF THE PREFERRED EMBODIMENT

Figure 1:
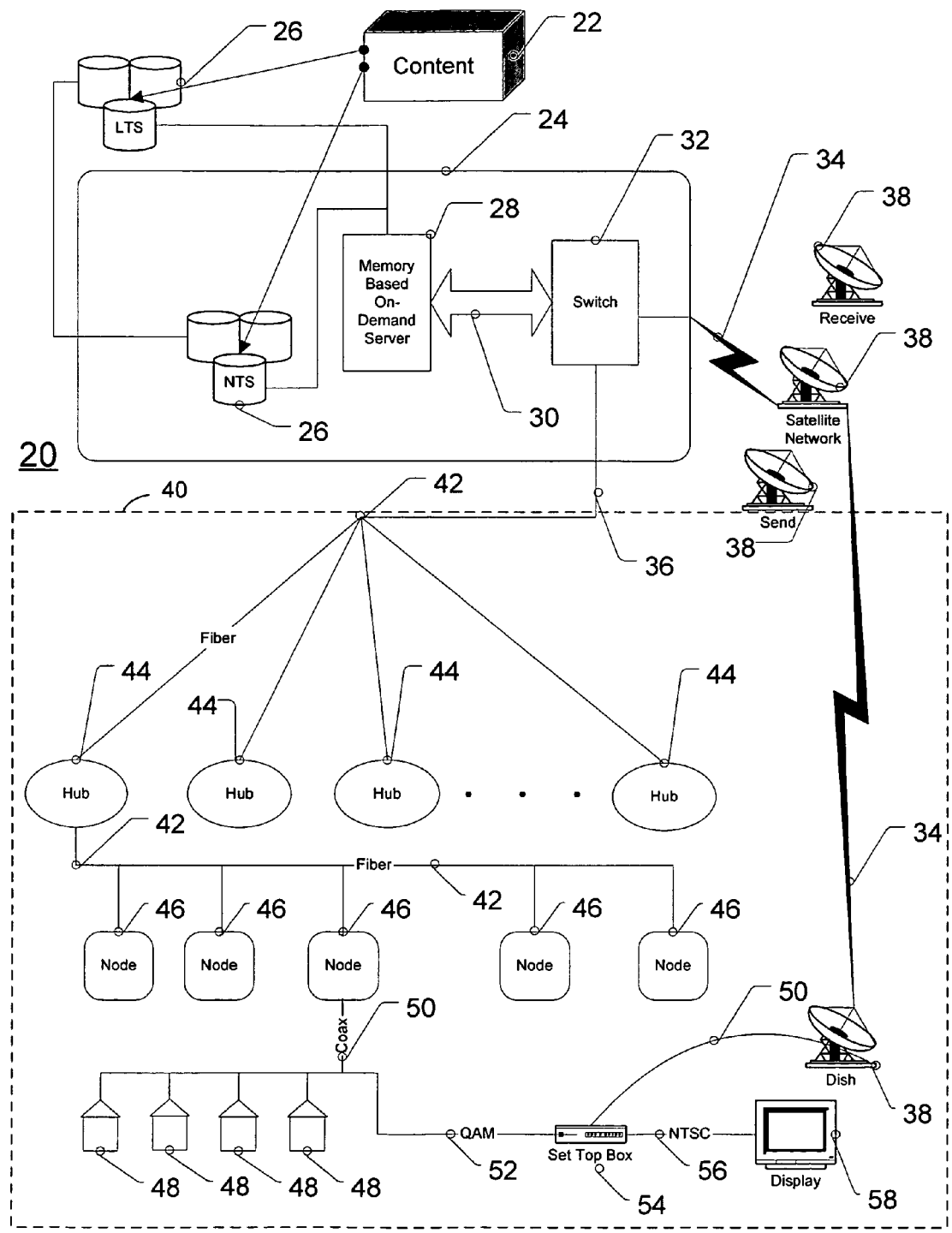
FIG. 1 is a schematic diagram illustrating an all memory server on-demand distribution system.

Referring to FIG. 1, a volatile memory based on-demand system is shown generally as element 20. Volatile memory advantageously can be random access memory (RAM) readily available in 2 Gigabyte chipsets. The memory based on-demand system 20 is configured to distribute content 22 to end users such as, for example, in a network distribution system. A head end 24 of the system 20 obtains content from short- or long-term storage in response to requests sent across the network distribution system by the end user. The head end 24 is generally configured with storage 26, such as disk storage from either of the short- or long-term storage that contains the content to be streamed, a volatile, content addressable memory (CAM) based on-demand server 28 such as a B-1 VOD Server or SBB-1 manufactured by Broadbus Technologies, Inc., a wide bus 30 and a switch 32.

Referring to the description herein some terms should be defined for the benefit and clear understanding of the present invention. Concurrency is the number of streams requesting a piece of content. Resident content means content entirely contained in the memory of the on-demand server 28. Segmented content is a content contained in the memory of the on-demand server 28, whereby only a window around the current stream location is kept in memory. A segment, for purposes of this patent application, is an 8 megabyte piece of content 22. Load is meant to indicate making a content 22 resident in the memory of the on-demand server 28. A credit is a portion of near-term-storage (NTS) bandwidth (BW), which in the present application is set to a unit of four (4) megabits-per-second (mbps). An overlap occurs each time one or more streams use the same segment of content 22 at the same time. A memory limit is a total amount of memory that can be allocated to streaming. A bandwidth limit is a limit of the total bandwidth that can be allocated, whereby setting the bandwidth limit to high may cause trick modes to stall due to unavailable bandwidth BW. A paging trick play speed limit means the maximum speed a stream that is playing segmented content 22 is allowed to play out in trick play mode.

Throughout this detailed description content 22 can generally refer to data, audio, visual or audio-visual works such as, for example, a movie file in an MPEG format that is played out to a customer's TV set. It will be appreciated, that the context and examples chosen by the applicant to illustrate the present invention, namely, pulling and playing a movie file to a customer's TV set were chosen for ease of illustrating the principals of the method for managing the resources of a RAM based on-demand server according to an exemplary embodiment the present invention. Content 22 also can be obtained and streamed out to a customer in other applications and formats. For example, the content 22 can be another form of data and in another format, specifically, an audio MP3 file. Moreover, data comes in numerous other formats that are streamed to a customer on-demand where it is still advantageous to manage server resources when the server is providing streaming to many, multiple end users to display and seamlessly play the requested content 22. As a result, managing information dynamically using a volatile memory based on-demand server across a world-wide network has other applications such as, for example, managing instant messaging, e-mail, streaming video conferencing, audio communications and the like.

The head end 24 illustrated in FIG. 1 connects to various distribution systems to obtain content 22 either wirelessly 34 or physically on a land line 36, or both. For example, wireless distribution 34 involves connecting the head end 24 to a satellite distribution network 38. Similarly, distribution by land line 36 connects the head end 24 to a high-speed fiber optical network 40 that can be configured, for example, to have high speed fiber optic lines 42, connected to hubs 44, with such hubs 44 connected to nodes 46, and the nodes connected to individual end-users 48, e.g. a particular home or residence. Presently, cable distribution of content 22 to an end user's residence uses coaxial cable 50 via Quaternary/Quadrature Amplitude Modulation (QAM) 52 to a distribution device such a set top box 38 that converts to a NTSC signal 56 input into an appropriate device 58 that can play out the content 22 to, for example, a TV, HDTV, LCD, a media center or other displaying device.

In an exemplary embodiment of the present invention, the method begins by ordering usage of the memory based on sorting the concurrency for a particular piece of content 22. When a customer makes a request, the stream controller 62, instructs the server 28 and related components to obtain and load the content 22 into memory of the server 28. The stream controller 62 makes a request to the server 28 to go out to disk storage, either long term or near term storage, loading the content 22 and transferred it to the RAM memory of the server 28. In the simplest example, the memory of the server 28 is empty for the first on-demand request for a particular piece of content 22 by a customer or other end user, e.g. such as a full length feature movie. Here, the content 22 is loaded entirely into memory, or made resident. The starting point of the movie is designated zero and given a corresponding starting address in the content addressable memory (CAM) of the server 28, which is managed separately.

Figure 2:
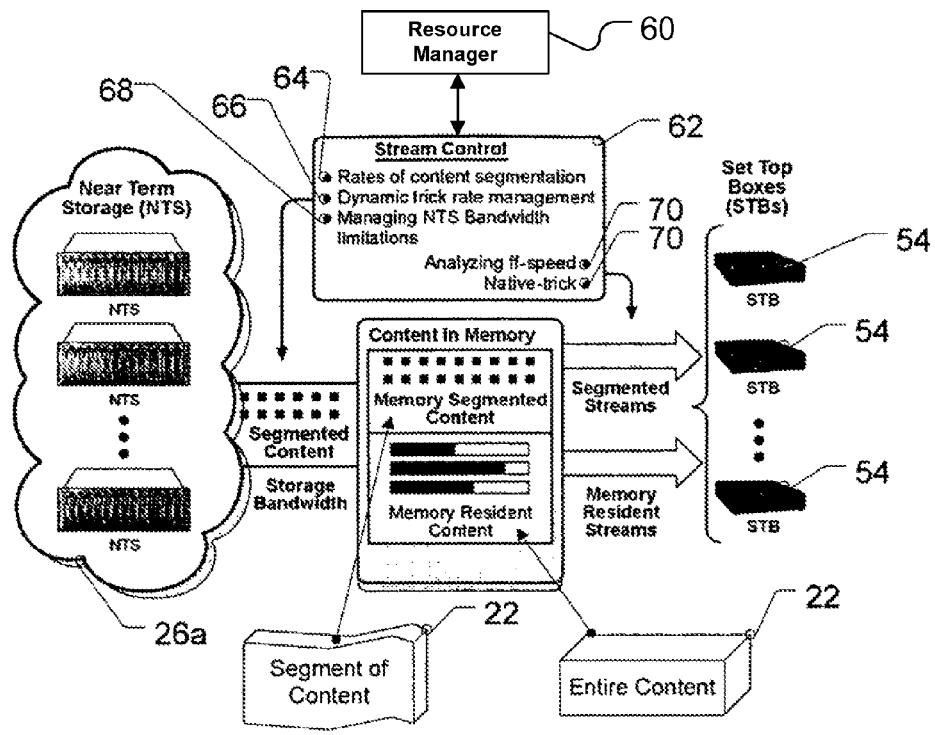
FIG. 2 is a schematic diagram illustrating the resource management system according to an exemplary embodiment of the present invention.

Referring to FIG. 2, an on-demand system 20 of the present invention includes a resource manager 60 having a Stream Controller 62 to provide content 22 by finding and streaming such content 22 to customer on-demand. The Stream Controller 62 is configured to control dynamically streaming functions such as, for example, loading content 22 entirely into memory 64, loading portions or segments of content 22 into memory 66, managing near-term-storage (NTS) bandwidth 68 limits, managing playback functions 70 such as trick play modes, and analyzing the speed of trick playout. For example, in the on-demand server of the present invention, content 22 demanded by an end user can be either pulled entirely into the memory or pulled into memory in segments from disk storage 26.

The Stream Controller 62 operates to receive packages containing assets and MPEG content files sent from a media provider or other asset owner to the cable or satellite network. The cable or satellite network uses a catcher to receive the packages and assets, which the catcher forwards to the asset manager application. The asset manager application records the association between the assets and their related content files and signals the FTP transfer of the content 22 from the catcher to the on-demand server 28. The Stream Controller 62 maintains the association between the contents 22 and the on-demand server 28 that store them on its NTS 26. The main functionality of the Stream Controller 62 is to:

Implement the Content 22 as an object as per ISA standard and insure persistence
  Maintain information about all of the Content 22 files installed on the on-demand server 28
  Provide functionality to remove Content 22 files.
  Create and maintain a unique handle for the content file and forward it to the VOD Server
  Provide the following Content 22 information to the on-demand server 28 including, but not limited to, bit-rate, path (URL containing IP address, user and password), and unique content ID
  Provide persistence for asset and Content 22 information
  Generate an alarm when a Content 22 ingest failed
  Log the Content 22 ingest events
  Notify the on-demand server 28 about Content 22 play out requests.

For example, the Content 22 is a movie in an MPEG-2 format ordered through the Cable or Satellite set-top-box 54 that is then played to user's TV. It can be appreciated that each movie has a predetermined length and each MPEG-2 file is played out sequentially. In this manner, the length of a particular piece of programming content has a predictable size, time, and or length. Sometimes, the playback of the movie can be adapted to an end user's trick playback options as is discussed herein. Content 22 that is stored in segments around a particular time uses less memory than content 22 stored entirely in memory. The method and system of the present invention utilizes a server 28 configured to determine which content 22 will be resident content 72 and which will be loaded into memory as segments of the content 22.

Figure 3:
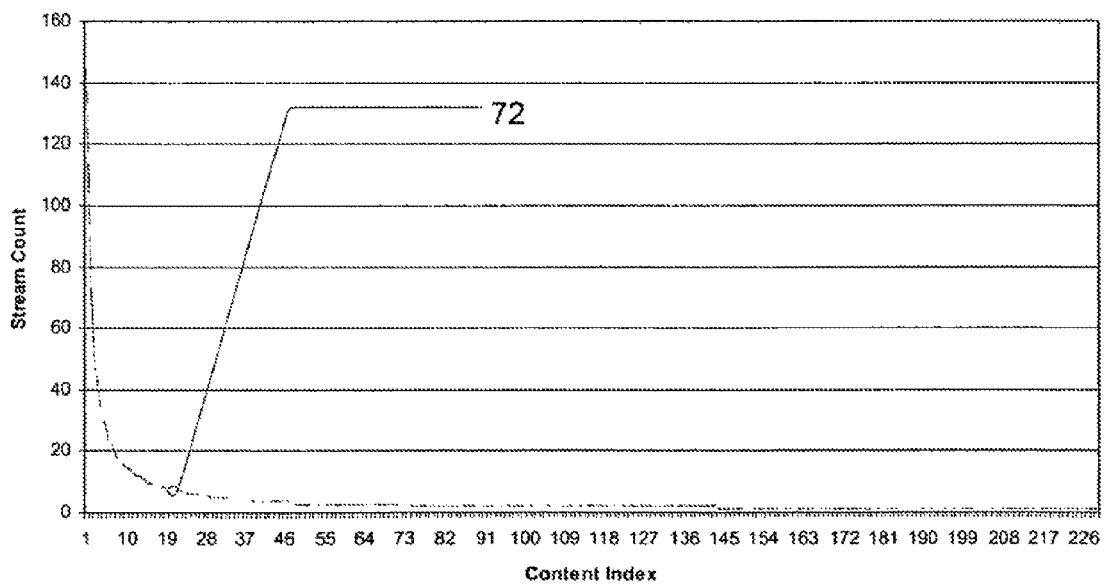
FIG. 3 is a diagram illustrating demand expected according to Zipf's principles.

In an on-demand server 28 utilizing a random access memory (RAM) according to the present invention uses an optimized method to yield optimal stream counts based on the concurrency data of the streams and bandwidth resources. FIG. 3 illustrates a general usage pattern showing a Zipf's curve 72, in which a decrease in the stream count for each content will follow the ratio of 20%, 10%, 6.6%, 5%, 4% . . . 1/n. Likewise, in a pure application of Zipf's curve 72 where each content uses 1/n of the total streams, the total streams using each content is inversely proportional to the rank, that is, proportional to 1, ½, ⅓, ¼, etc. Presently, conventional on-demand servers usage is subject to two kinds of modifications: the first alteration is to add a constant to the rank, giving 1/(1+constant), 1/(2+constant), 1/(3+constant), 1/(4+constant), etc., whereby the constant is a ranking such as, for example, a Nielsen rating, and the second alteration changes the starting point for the curve, for example, starting at 10% usage for the first content. The present invention, instead of comparing concurrency data with Zipf's original law, applies additional factors such as, for example, a number is added to the rank and to the power 1, which are used to adjust the resident content 72 and segment content 74 for an optimal fit to yield optimized stream and bandwidth resources.

Figure 4:
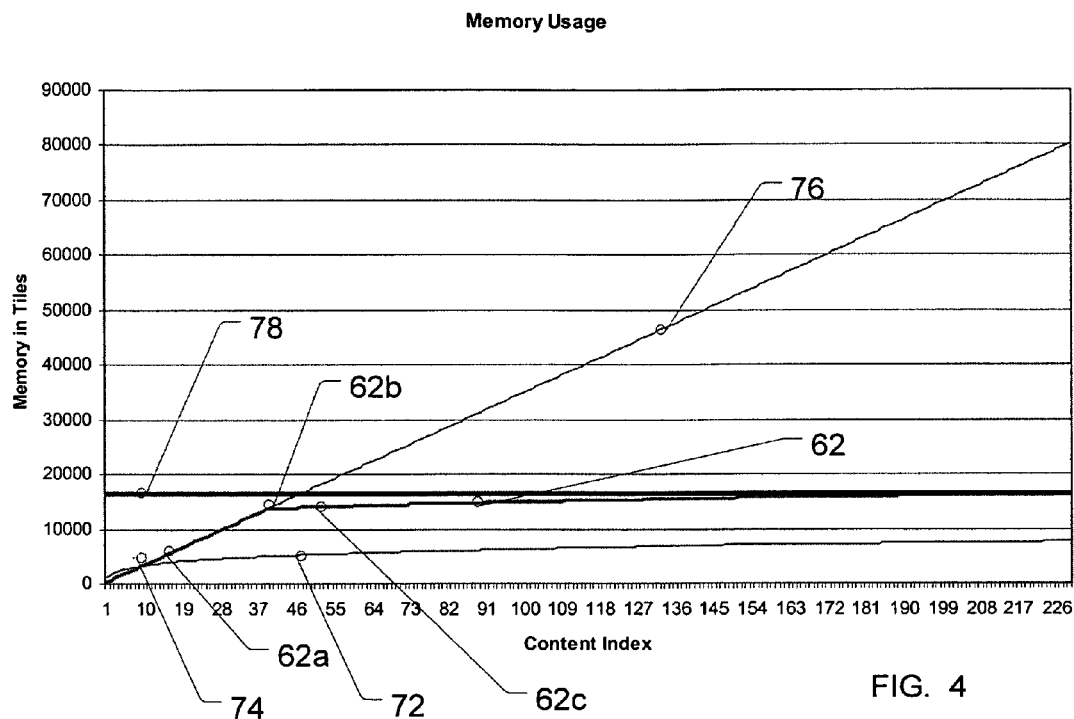
FIG. 4 is a diagram illustrating resource management in view of memory usage of content and content segments according to an exemplary embodiment of the present invention.
Figure 5:
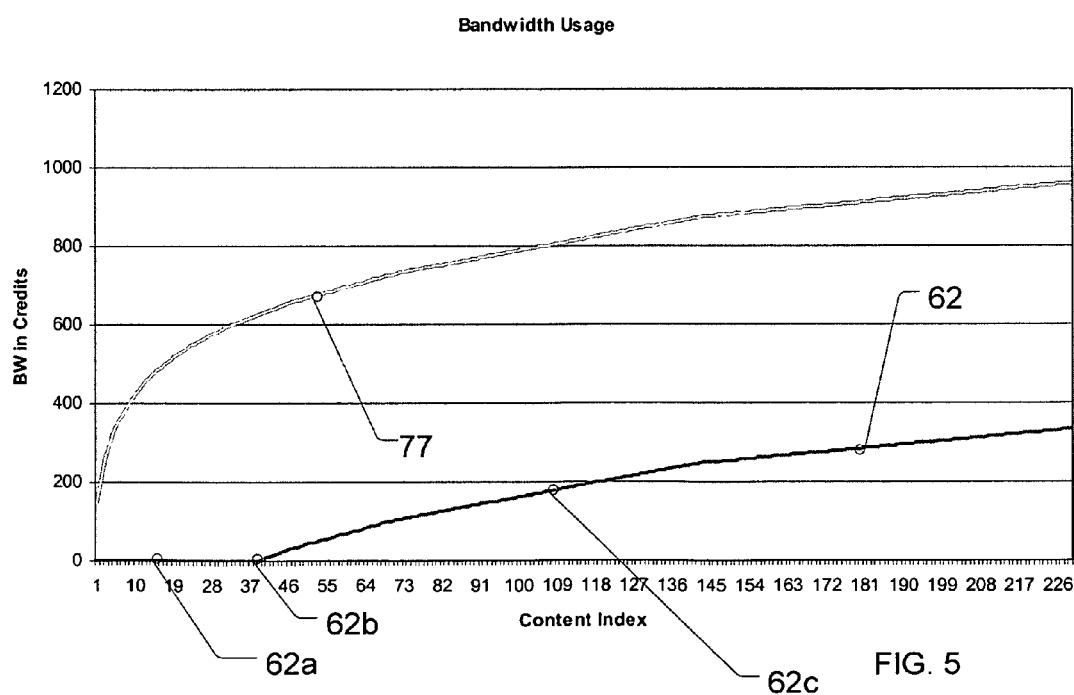
FIG. 5 is a diagram illustrating resource management in view of bandwidth usage of content and bandwidth in credits according to an exemplary embodiment of the present invention.

Referring now to FIGS. 4-5, the method and system is illustrated for managing and optimizing the resources of the on-demand server 28. For the purpose of describing the present invention, when content 22 is stored entirely in the memory of the on-demand server 28 it is termed Resident Content 72. When a segment of the content 22 to be streamed is stored in memory in the memory of the on-demand server 28 it is termed Segment Content 74, for example, if a portion of an MPEG movie file is striped, paged, tiled or otherwise stored in less than Resident Content 72. When all contents 22 are entirely resident in a 1:1 ratio, the required memory usage is designated by line 76. When all contents are paged then the bandwidth requirement is designated by line 77. The method and system described in the present invention optimizes these two usage curves by balancing the memory usage against the bandwidth requirements by making contents with the highest concurrency values resident and thereby reducing the bandwidth requirements for streams on those contents 62a. The contents with lower concurrency are played using segmented content thereby reducing the memory requirements 62c while using bandwidth to the disk arrays.

Content 22 with high concurrency values go in memory first; low concurrency content 22 is segmented first. As content 22 changes between resident and segmented its concurrency value changes relative to the other content 22 in the memory of the server. Simply, the present invention advantageously operates to convert resident content 72 to segmented content 74 until both resident and segmented content 72 and 74, respectively, occupy the available memory of the on-demand server 28. In an alternative embodiment of the present invention, a single attempt is made to fit the entire content 22 in memory available in the server 28 at the time of the attempt. If memory can accommodate the content 22, make it resident content 72. If memory of the server cannot accommodate the content 22, make it segment content 74. Finally, a stream playing multiple contents in a play list is made segmented 74 until all of the content 22 files can be made resident 72.

Referring to FIG. 4, according to an exemplary embodiment of the present invention, the graphical diagram illustrates memory usage relationship between the number of pieces of content 22 tracked by the server in a content index and the memory usage in tiles such as, for example, an 8 megabyte piece of a content 22. In on-demand memory based servers, the resident content 72 and the segment content 74 are dynamically managed by the Stream Controller 62 to fit within in the available memory 78. At first, resident content 72 having a high concurrency is loaded into memory and there is no segmented content 74 as shown at element 62*a*. Later, the Stream Controller 62 makes a choice of whether to make content 22 resident content 72 or segment content 74 based on bandwidth, memory limits and concurrency as shown at element 62*b*. As more users request additional content 22, the Stream Controller 62 makes a choice of whether to make content 22 resident content 72 or segment content 74 based on bandwidth, memory limits and concurrency as shown at element 62*c*.

Referring to FIG. 5, according to an exemplary embodiment of the present invention, the graphical diagram illustrates bandwidth usage relationship between the available bandwidth credits and the number of pieces of content 22 tracked by the server in the content index. In on-demand memory based servers, the resident content 72 and the segment content 74 are dynamically managed by the Stream Controller 62 to fit within in the available bandwidth. Streams playing resident 62*a* content require no bandwidth once the content is loaded into memory while segmented contents required bandwidth proportional to the number of streams playing the content 62*c*.

Figure 6:
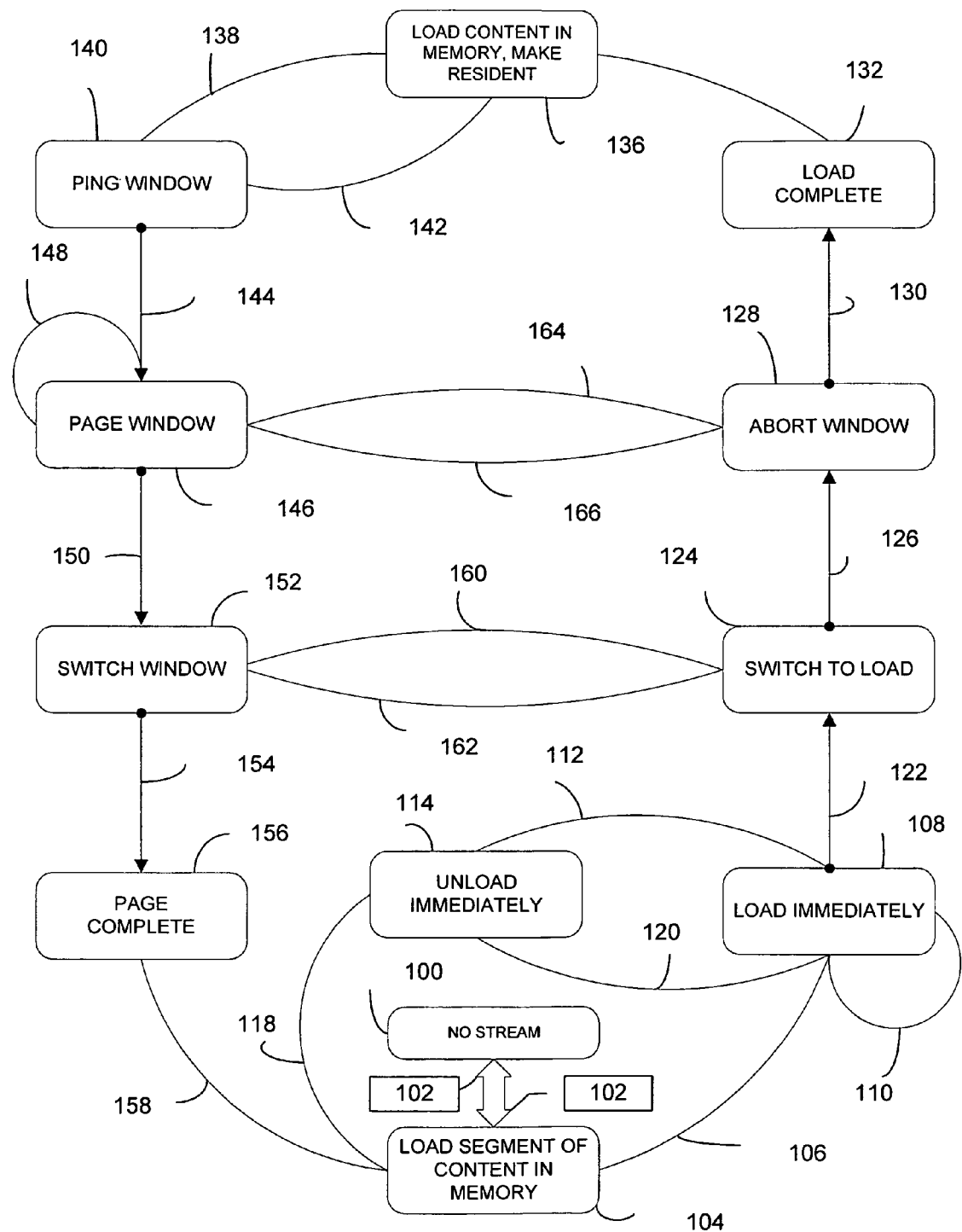
FIG. 6 is a state diagram illustrating transition between segmented and resident content usage.

As concurrent requests of users increase, the advantages of the present invention are illustrated in FIGS. 4 and 6 over conventional on-demand servers having a one-to-one ratio to page content 77. Conventional on-demand servers only stream directly from disk and, therefore, are limited to small stream counts in a one-to-one ratio 77. Such conventional on-demand servers have disadvantages of physical limits being reached in disk access times, the need for heterogeneous upgradeability of such disks (forklift upgrade) and speed. As a result, such servers are inherently more deterministic in the number of supportable streams and are largely limited by disk access times.

The present invention advantageously can use a combination of NTS and a large memory cache to increase stream count in a usage model having high concurrency counts. In such a usage model where all streams are playing unique content 22 files, the method and system of the present invention operates similar to a pure disk based system and the stream counts are low. Stream counts can be very large if all streams are accessing the same content 22 as it is loaded into memory once then no disk accesses are required to support the play out. However, the true usage model is somewhere between the two extremes, where most of the streams are accessing a relatively small number of content 22 files, while a subset are accessing unique content 22 objects which is why factoring in concurrency counts assist to optimize streaming of the content 22.

In the present invention, DRAM caches with fast access times support a large number of streams, but are limited by cost to sizes that are not capable of holding all the content 22 files on concurrency in a video on-demand (VOD) or other on-demand deployment library. DRAM is also not persistent between power cycles, so the contents must also be stored on disks. Disk based arrays have very large storage capacity but are limited in the number of streams they can support due to slow access times. The optimal VOD server combines the best aspects of both technologies to support the largest number of streams possible. The stream count is maximized when content 22 files that are being streamed to a large number of set tops are entirely loaded into memory, while content 22 files with small stream counts only load a portion of the content 22 into memory around the current play out location for each stream.

The method of the present invention optimizes the memory and NTS bandwidth usage to support the maximum number of streams at all times by pulling highly used content 22 files into the memory cache while leaving the other content 22 files to stream directly from the disks. The method begins by ordering usage of the memory based on sorting the concurrency for a particular content 22 relative to the usage of other content 22 files. The sorting bases its first allocation of memory on the assumption that all streaming content 22 can be stored in resident memory. If the memory limit is not reached all contents 22 are subsequently pulled into memory. If the limit is exceeded, the method takes repetitive steps to convert the least used contents 72 to segment content 74 until all requested content 22 fits into the available memory. When a particular piece of content 22 is converted to segment content 74 from resident content 72 the memory required to hold the entire content 22 is freed and only a small window for each stream playing that content 22 allocated in its place. The sorting process packs first the content 22 with the highest concurrency values as resident content 72 into memory of the on-demand memory based server 28. The method or process of the present invention makes segments content 74 with the lowest concurrency first, thereby freeing memory and using the minimum NTS bandwidth. Dynamically, the resident content 72 and segment content 74 adaptively changes as its concurrency values change relative the requests for other content 22. However, a stream playing multiple content 22 files in a play list is still played as segmented 74 until all of the content 22 files are made resident content 72. Furthermore, bandwidth is allocated based on the content 22 play rate because standard definition content 22 files require less bandwidth than high definition content files.

According to an exemplary embodiment of the present invention, the size of the segment window is also scaled to account for the higher play out rates required for high definition (HD) transmission. Both the memory and bandwidth limits are tested whenever a new stream is requested. If the resources are not available the stream cannot be created without affecting current streams and is therefore rejected. Each segmented stream requires (bit Rate/4 mbps+1) credits. Each segmented stream requires credit*8 tiles. When a content 22 is converted from resident content 72 to segmented content 74 the memory savings is equal to:

$$\text{(content size) minus (--) (credit*8)*(number of streams)} \quad \text{Eq. (1)}$$

The bandwidth (BW) required is:

$$\text{(credit*number of streams)} \quad \text{Eq. (2)}$$

The BW credits required to load a content 22 are consumed until the load is complete. All loads occur in parallel as fast and efficiently as possible as determined by the Stream Controller 26. Overlap that is not otherwise accounted for as all segmented 72 streams are assumed to use their full bandwidth requirements, however, when overlap does occur the segments will be reused in memory without loading additional copies of the segments, thereby reducing the actual disk usage. The method and process of the present invention to optimize on demand server 28 resources by manipulating the configuration of resident content 72 and segmented content 74 is run whenever a new stream is added to the system. While it is possible to optimize again when streams are deleted, it may not be necessary as then system will already be capable of supporting all existing streams.

According to an exemplary embodiment of the present invention, conditions for stream creation can be bounded by two elements: (1) Bandwidth—the memory fits, but the bandwidth isn't available to page, and (2) Memory—there is not enough memory available even after all streams are converted to segmented content. Each of these conditions can be reported to the Stream Controller 62 to show and report content statistics. For example, certain statistics about the system usage include:

Settings for memory and bandwidth limits
Memory that would be required to make all active contents resident.
Stream count of the content with the highest usage.
Memory usage for both resident and segmented contents.
Bandwidth used for loading resident contents.
Bandwidth used for segmented streams.
Number of resident and segmented contents.
Number of resident and segmented streams.

Referring to FIG. 6, the method and system of managing resources in the on-demand server 28 is configured to utilized methods (1) that operate on the stream server in communication with the streaming hardware; and (2) that operate on the content manager so as to optimize fitting content into the memory on-demand server 28. The Stream Controller 62 is configured to control the server 28 communications and streaming hardware. The above-described resource manager 60 is configured to fitting content into the content addressable memory (CAM) of the on-demand server 28 with streaming out of NTS so as to optimize bandwidth and memory based on concurrency. The resource manager 60 is further configured to generate statistics to the Stream Controller 62 to pull content on and off of NTS and into memory.

Referring to FIGS. 2 and 6, the method and system of managing resources in the on-demand server 28 is configured to utilize methods (1) that operate on the stream server in communication with the streaming hardware; and (2) that operate on the content manager so as to optimize fitting content into the memory on-demand server 28. The Stream Controller 62 is configured to control the server 28 communications and streaming hardware. The above-described resource manager 60 is configured to fit content into the content memory (CMEM) of the on-demand server 28 with loading out of NTS so as to optimize bandwidth and memory based on concurrency. The resource manager 60 is further configured to generate requests to the Stream Controller 62 to pull content on and off of NTS and into memory.

Referring to FIGS. 1 and 2, the method of managing resources in the on-demand server 28 is illustrated so as to optimize the loading of resident and segmented content into the Content memory of the on-demand server 28. Initially, each piece of content is ingested into the content memory of the on-demand server 28 along with additional information for trick play. At this time, the content is immediately available for streaming as well as transfer to NTS.

At any specific time ($t_1$, $t_2$ or $t_3$) the on-demand server is tracking the relative locations in the content that is being accessed by each stream. It manages a segment of the content for each stream that extends forward and backward from the current content location. For example, at time $t_1$ the first N parts of content relative address 0 to N−1 are loaded into CMEM. At time $t_2$, the control dumps segments 0 to 2 and adds segments N to N+2 for a segment of 3 to N+2. If the stream were in reverse, part 2 would be reloaded and part N+2 would be dumped. At all times the resource manager is tracking each particular stream to determine position and direction so as to understand (1) what part of the content is being accessed, (2) which direction the stream is playing and, therefore, manages the loading and dumping of more parts in a timely manner to enable normal streaming and trick play features. The number of parts can expand depending on the size that is needed for streaming, trick play features or for different content sizes such as high definition, where the content file is four times as big as a standard file for the same amount of playtime.

Referring to FIG. 6, the interaction between the resource manager and the stream control described above continuously determines what content is resident in content memory and what content needs to be segmented to content memory for streaming. The process actions and process states 100 through 166 illustrate the transition of content between the fully resident and segmented operation. Non fatal problems can occur between the streaming hardware and streaming process or the hardware may be busy and cannot respond to the software fast enough. However, the system is set up so that the current page of content needed to satisfy a customer request is always available to the stream so as not to generate a blank screen. The present invention advantageously utilizes the predictability of the sequential content: segmented content uses less memory than resident content, whereby such that resources can be managed for large numbers of streams. Also advantageously, the resource manager makes a decision, at any time, whether to convert the content in memory to between paged and resident so as to optimize the bandwidth streaming from the server. In FIG. 8, which describes the transition, the boxes are the state of the stream and arrows are the actions we take to transfer from state to state, one box to another.

At state 100, there is no stream using a content. At action 102, the resource manager is given a request to start a stream. Content memory is allocated to hold the content segment, the segment is loaded from NTS if needed and the stream is started. The stream is now running on segmented content in state 106. At state 106, the stream control will continue to load and release content as the stream progresses through the content with the intent of keeping the size of the content in the segment fixed and centered on the current stream request. At action 104, an instruction is given to delete a stream. causing the (1) transfer of content from NTS to Content memory to be stopped or aborted; (2) deleting of tiles already in Content memory; and (3) freeing the Content memory allocation for use by other streams.

Stream control may decide that a specific content should be made resident and all streams with their own segments of the content switch over to using the single copy of resident content. Beginning with action 108, Content memory is allocated for the entire content and a load request for the entire content is issued. Note that the streams are still actively using content segments while the content load continues in state 110. At any time, the stream control may decide to switch the content back to using segments. For state 110, action 114 shows the actions that result from this decision with the abort of the content load request. Since this abort may take some time, state 116 is entered while waiting for the abort to finish. In this interval, the stream control may reverse its decision again and restart the transition to resident content. Action 120 is then taken to restart the load of the content from what is in thus far and reenter state 110. If the content load abort started by action 114 completes while in state 116, action 118 is taken to free the allocation of Content memory for the resident content and delete it. The state of the content is set back to 104. At state 110, the loading of content may proceed to completion and trigger action 122. This action will request each stream to stop using its content segment and switch to using the resident content. While waiting for the switch replies, state 124 is entered. When all streams have switched to the resident content, action 126 is triggered to abort all load requests for the content segments that have been operating up to this time. State 128 is entered while the load aborts are being processed. When the load aborts are all completed, action 130 is triggered to delete the content segments and return the Content memory allocated for those segments. All streams using this content are now accessing the single copy of resident content indicated by state 136.

With all streams using resident content in state 136, the stream control may switch back to each stream using its own segment of the content. To start the transition, action 138 requests the current location of each stream within the content so that the correct segment can be loaded for it. State 140 is entered while waiting for the location replies. If the stream control switches back to resident content, action 142 puts the state back to state 136 and the location replies are ignored. When the streams reply with their locations and the content is still in state 140, action 144 will allocate content segments for each stream in Content memory and issue segment loads to NTS. State 146 is entered while the loads complete. If stream control transitions back to resident content at this time, action 164 is triggered to abort the segment loads and state 128 is entered. In a symmetric manner, if state 128 is waiting for content segment aborts and the content is transitioned to using segments, action 166 is triggered to reissue the segment loads and state 146 is entered. When segment loads complete, the streams are all requested to switch over to using the segments by action 150 and state 152 is entered while waiting for the replies. A stream control transition back to resident content would trigger action 160 which would issue another set of switches back to the resident content and set the state to 124. In state 124, a transition to segmented content would trigger action 162 which would issue stream switch requests to use content segments and set state to 152. When all streams are switched to using content segments, action 158 will delete the resident content and free the Content memory allocation for the resident content. All streams will now be using their own content segment in state 106.

The method and system of the present invention can dynamically adjusting BW limit based on trick play rates. The streaming playback of content stored in the video on-demand server of the present invention supports record and playback features operated by a user or customer also known as trick play modes. Trick play includes controlling the playing out a program content such as, for example, pause, play and stopping the playing of the content as well as fast forward (FF) and rewinding (R) the program. The fast forward and rewinding of the program can be accomplished in many speeds such as 1×, 2×, 4× and multiples thereof. Trick play mode also can take a user to content segmentation such as skipping around, in any direction possible, and in any conceivable combination or playback listing to chapter, volume, section and the like.

Referring to FIGS. 1 and 4, the present invention supports segmented content 74 which can be streamed by the on-demand server 28 by loading into memory from NTS 26 only the portion of segmented content 74 required to stream at the present moment in time. Segmented content 74 conserves the on-demand server 28 DRAM resources and allows for providing higher numbers of unique content streams. While segmented content 74 conserves DRAM, segmented content 74 consumes NTS 26 storage bandwidth. Trick play features such as fast-forward and rewind may consume NTS 26 storage bandwidth at a greater rate than segmented content streaming at normal play rate. It is a desirable feature of any media serving system 28 to allow multiple fast-forwarding and rewinding rates. Higher trick speeds of segment content 74 may result in higher NTS 26 storage bandwidth utilization. The method and system of the present invention supports the dynamic modification of current trick play rates to prevent the oversubscription of NTS 26 bandwidth and thus any resulting negative impact on segmented content 74 delivery. Dynamic trick play management allows segmented content 74 streams to trick at the highest rate possible based on current NTS 26 bandwidth utilization. As NTS 26 bandwidth utilization increases maximum trick rates are reduced, whereby if trick rates where left unbounded, streams at normal play rate could be starved of media and forced into a pause state.

The present invention calls for the on demand server 28 to continually monitor NTS 26 bandwidth utilization. If NTS 26 bandwidth utilization rises above a configured value, the on-demand server 28 will automatically reduce the trick rate of streams using segmented content 74. Streams consuming the largest amount of NTS 26 bandwidth, that is streaming at the highest rates, are forced to reduce their NTS 26 bandwidth utilization first. This is accomplished by dropping the streams trick play rate from a high value to a lower value. This process of reducing the trick rate of stream running at high trick rates continues until NTS 26 bandwidth utilization drops down to an acceptable level. This method of continually reducing the highest trick rate streams allows for the support of the maximum number of streams to simultaneously operate at low trick rate during periods of high NTS 26 utilization. This method also allows for maximum trick rates to be supported during periods of low utilization, that is when NTS 26 bandwidth is not limited.

The method and system of the present invention manages bandwidth that the on-demand server 28 applies to new streams attempting to enter trick mode. If the on-demand server 28 determines that the requested trick speed will cause NTS bandwidth utilization to rise above the configured maximum value, the requested speed will be dynamically reduced until the limit is not exceeded. If the reduction of trick speed to the lowest supported rate is still not enough to pull back NTS bandwidth utilization to below the configured maximum value, the trick play request will be rejected and the on-demand server 28 will generate the appropriate action or error.

Although exemplary embodiments of the present invention have been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

We claim:

1. An on-demand, memory-based server for requesting content from a content storage device and streaming the requested content to a receiving device on a network, the server comprising:

a server memory for storing requested content from the content storage device; and a resource manager for managing resources of the server, the resource manager being arranged to manage the steps of:

receiving a request for content from the receiving device;

determining a concurrency count for the requested content, wherein the concurrency count is the number of streams requesting that content;

determining, based on the determined concurrency count, whether to store the requested content from the content storage device as resident content or segmented content, wherein the resident content contained in the server memory comprises the entire requested content, wherein the segmented content contained in the server memory does not comprise the entire requested content, and wherein the segmented content contained in the server memory comprises a window around a current stream location of the requested content;

storing the requested content from the content storage device in the server memory as resident content or segmented content, based on the determining; and streaming the requested content from the server memory to the receiving device, whereby multiple simultaneous streams of audio, video and/or data may be streamed by the server.

2. A method of streaming multiple simultaneous streams of audio, video and/or data content from an on-demand, memory-based server, the server comprising a server memory for storing requested content from a content storage device, the method comprising the steps of:

receiving a request for content from a receiving device on a network;

determining a concurrency count for the requested content, wherein the concurrency count is the number of streams requesting that content;

determining, based on the determined concurrency count, whether to store the requested content from the content storage device as resident content or segmented content, wherein the resident content contained in the server memory comprises the entire requested content, wherein the segmented content contained in the server memory does not comprise the entire requested content, and wherein the segmented content contained in the server memory comprises a window around a current stream location of the requested content;

storing the requested content from the content storage device in the server memory as resident content or segmented content, based on the determining; and streaming the requested content from the server memory to the receiving device.

3. The server of claim 1, wherein the resource manager is further arranged to manage a step of determining bandwidth usage between the content storage device and the server; and wherein the step of storing the requested content from the content storage device in the server memory as resident content or segmented content is further based on the determined concurrency count and bandwidth usage.

4. The server of claim 1, wherein the resource manager is further arranged to manage steps of:

ranking requested content by its concurrency count; and allocating the requested content for storage in the server memory as resident content in order from highest concurrency count towards lowest concurrency count.

5. The server of claim 4, wherein the server memory has a memory limit and the resource manager is further arranged to manage the step of, when the memory limit is exceeded before all requested content has been allocated as resident content in the server memory, allocating or converting the requested content to segmented content in order from lowest concurrency count towards highest concurrency count, such that all requested content may be stored in the server memory.

6. The server of claim 1, wherein the resource manager is further arranged to manage the steps of monitoring bandwidth usage between the content storage device and the server and adjusting an available trick mode play rate for a stream of segmented content in order to maintain the bandwidth usage below an acceptable reference level.

7. An on-demand, memory based system, comprising:
a content storage device for storing content to be streamed; and
the on-demand, memory-based server of claim 1.

8. The method of claim 2, further comprising the steps of:
determining bandwidth usage between the content storage device and the server; and
storing the requested content from the content storage device in the server memory as resident content or segmented content based on the determined concurrency count and bandwidth usage.

9. The method of claim 2, further comprising the steps of:
ranking requested content by its concurrency count; and
allocating the requested content for storage in the server memory as resident content in order from highest concurrency count towards lowest concurrency count.

10. The method of claim 9, wherein the server memory has a memory limit and the method further comprises the step of, when the memory limit is exceeded before all requested content has been allocated as resident content in the server memory, allocating or converting the requested content to segmented content in order from lowest concurrency count towards highest concurrency count, such that all requested content may be stored in the server memory.

11. The method of claim 2, further comprising the steps of:
monitoring bandwidth usage between the content storage device and the server; and
adjusting an available trick mode play rate for a stream of segmented content in order to maintain the bandwidth usage below an acceptable reference level.

* * * * *